United States Patent
Gaddis et al.

(10) Patent No.: US 6,965,937 B2
(45) Date of Patent: Nov. 15, 2005

(54) METHOD AND SYSTEM FOR SENDING INFORMATION ON AN EXTRANET

(75) Inventors: Michael E. Gaddis, Defiance, MO (US); David Barmann, Valley Park, MO (US); Peter N. Hicks, Webster Groves, MO (US); Michael A. Brown, University City, MO (US)

(73) Assignee: WilTel Communications Group, LLC, Las Vegas, NV (US)

( * ) Notice: Subject to any disclaimer, the term of this patent is extended or adjusted under 35 U.S.C. 154(b) by 753 days.

(21) Appl. No.: 09/849,176

(22) Filed: May 4, 2001

(65) Prior Publication Data

US 2002/0069292 A1 Jun. 6, 2002

(Under 37 CFR 1.47)

Related U.S. Application Data

(63) Continuation-in-part of application No. 09/597,853, filed on Jun. 20, 2000, now abandoned.
(60) Provisional application No. 60/202,456, filed on May 6, 2000.

(51) Int. Cl.$^7$ .............................................. G06G 13/00
(52) U.S. Cl. ........................ 709/227; 709/238; 709/246; 709/249
(58) Field of Search ................................. 709/227, 238, 709/246, 249, 217, 219, 230, 236, 245, 250, 228

(56) References Cited

U.S. PATENT DOCUMENTS

| | | | | |
|---|---|---|---|---|
| 5,325,362 A | | 6/1994 | Aziz | |
| 6,104,716 A | * | 8/2000 | Crichton et al. | 370/401 |
| 6,118,785 A | * | 9/2000 | Araujo et al. | 370/401 |
| 6,137,791 A | * | 10/2000 | Frid et al. | 370/352 |
| 6,292,839 B1 | * | 9/2001 | Naudus et al. | 709/238 |
| 6,442,588 B1 | * | 8/2002 | Clark et al. | 709/203 |
| 6,449,272 B1 | * | 9/2002 | Chuah et al. | 370/389 |
| 6,466,985 B1 | * | 10/2002 | Goyal et al. | 709/238 |
| 6,473,863 B1 | * | 10/2002 | Genty et al. | 713/201 |
| 6,631,416 B2 | * | 10/2003 | Bendinelli et al. | 709/227 |
| 6,640,251 B1 | * | 10/2003 | Wiget et al. | 709/238 |

FOREIGN PATENT DOCUMENTS

DE        199 03 967 A1        1/1999

OTHER PUBLICATIONS

Kathleen Cholewka, CoreExpress Guarantees Quality Internet Service, Apr. 13, 2000, p. 1, Received from: CoreExpress via fax on May 4, 2000, Forbes Digital Tool www.forbes.com © 2000 Forbes Inc.

Denise Pappalardo, New services extend VPN assurances, The network portal: www.nwfusion.com, pp. 1–3, Received from: CoreExpress via fax on May 4, 2000.

RFC 2764, Glesson, et al., IP Based Virtual Private Networks, Informational, [online], Feb. 2000, pp. 1–63, [retrieved on Mar. 30, 2000] Retrieved from: http://sunsite.auc.dk/RFC/rfc/rfc2764.html.

RFC 1633, Braden, Clark & Shenker, Integrated Services in the Internet Architecture: An Overview, [online], pp. 1–34, [retrieved on: Apr. 26, 2000], Retrieved from: http://sunsite.auc.dk/RFC/rfc/rfc1633.html.

RFC 2638, Nichols, et al., A Two-Bit Differentiated Services Architecture for the Internet, Informational, [online], pp. 1–27, [retrieved on Apr. 26, 2000], Retrieved from: http://sunsite.auc.dk/RFC/rfc/rfc2638.html.

(Continued)

*Primary Examiner*—Viet D. Vu
(74) *Attorney, Agent, or Firm*—Fellers, Snider, Blankenship, Bailey & Tippens, P.C.

(57) ABSTRACT

A method and system providing a single, symmetric path for forward and return traffic between two points on a network.

32 Claims, 8 Drawing Sheets

OTHER PUBLICATIONS

RFC 2475, Blake, et al., An Architecture for Differentiated Services, Informational, [online] pp. 1–37, [retrieved on Apr. 26, 2000], Retrieved from: http://sunsite.auc.dk/RFC/rfc/rfc2475.html.

RFC 2212, Shenker, et al., Specification of Guaranteed Qualilty of Service, Standards Track, [online] pp. 1–21, [retrieved on Apr. 26, 2000], Retrieved from: http://sunsite.auc.dk/RFC/rfc/rfc2212.html.

RFC 1701, Hanks, Li, Farinacci & Traina, Generic Routing Encapsulation (GRE), [online], pp. 1–9, [retrieved on Mar. 30, 2000], Retrieved from: http://sunsite.auc.dk/RFC/rfc/rfc1701.html.

RFC 1702, Hanks, Li, Farinacci & Traina, [online], pp. 1–5, [retrieved on Mar. 30, 2000], Retrieved from: http://sunsite.auc.dk/RFC/rfc/rfc1702.html.

Braden, R., et al. "Integrated Services in the Internet Architecture: an Overview", pp. 1–34, Jun. 1994. Retrieved from the Internet: http://sunsite.dk/RFC/rfc/rfc1633.html, Retrieved on Mar. 6, 2001.

Nichols, K., et al. "A Two–bit Differentiated Services Architecture for the Internet", pp. 1–27, Jul. 1999. Retrieved from the Internet: http://sunsite.dk/RFC/rfc/rfc2638.html Retrieved on Mar. 6, 2001.

Blake S. et al. "An Architecture for Differentiated Services", pp. 1–37, Dec. 1998. Retrieved from the Internet: http://sunsite.dk/RFC/rfc/rfc2475.html Retrieved on Mar. 6, 2001.

Shenker, S. et al. "Specification of Guaranteed Quality of Service", pp. 1–21, Sep. 1997. Retrieved from the Internet: http://sunsite.dk/RFC/rfc/rfc2212.html Retrieved on Mar. 6, 2001.

Cisco.com web pages, "Using the Border Gateway Protocol for Interdomain Routing" pp. 1–65 [online] [retrieved on Mar. 6, 2001]. Retrieved from the Internet: http://www.cisco.com/univcd/cc/td/doc/cisintwk/ics/icsbgp4.htm.

ANX: RADGUARD and the Automotive Network eXchange, [online] p. 1 [retrieved Mar. 30, 2000] Retrieved from: http://www.ciprovpn.com/ANXexplained.html.

InterAgent® Software [online] Enron Broadband Services, p. 1 [retrieved Mar. 30, 2000] Retrieved from: http://www.ec.enron.com/isp/ein/interagent.html.

What is the EIN?, [online] Enron Broadband Services [retrieved May 6, 2000] Copyright 1997–2000 Enron Corp., pp. 1–2, Retrieved from: http://ww.enron.net/isp/ein.

Solutions for ISPs [online] Enron Broadband Services, pp. 1–2 [retrieved May 6, 2000] Copyright 1997–2000 Enron Corp., Retrieved from: http://www.enron.net/isp/.

Les Cottrel, Automotive Network eXchange (ANX), [online] Slides 1 of 19, Presentation given at ICFA–NTF at CERN Mar. 1998 [retrieved Mar. 30, 2000], Retrieved from: http://www.slac.stanford.edu/grp/scs/net/talk/icfa–anx/sld001.htm.

Net Access Selects Imation Corp. to Deliver World–Class Customer Support for Their Automotive Network Exchange (ANX) Transaction Security Systems, [online] Imation, pp. 1–3, Copyright 1999 Imation, [retrieved Mar. 30, 2000], Retrieved from: http://www.imation.com/about news/news-item/0,1233,256,00.html.

Imation Corporation home, [online], pp. 1–2, Copyright 1999, [retrieved Mar. 30, 2000], Retrieved from: http://www.imation.com/index.html.

CoreExpress Guarantees Quality Internet Service, [online], Forbes.com: Apr. 13, 2000—News, pp. 1–2,™© 2000 Forbes.com, [retrievd May 4, 2000], Retrieved from: http://www.forbes.com/tool;/html/00/apr/0413/mu5.htm.

"Border Gateway Protocol (BGP)", copyright 1989–1999 [online], Retrieved from the Internet <URL: http://www.csico.com/univercd/cc/td/doc/cisintwk/ito doc/bgp.htm>, pp. 1–7.

Hanks, S., et al., RFC 1701, "Generic Routing Encapsulation (GRE)", Oct. 1994, [online], Retrieved from the internet <URL: http://src.doc.ic.ac.uk/computing/internet/rfc/rfc1701.txt>, pp. 1–8.

Hanks, S., et al., RFC 1702, "Generic Routing Encapsulation Over IPv4 Networks", Oct. 1994, [online],Retieved from the internet <URL: http://src.doc.ic.ac.uk/computing/internet/rfc/rfc1702.txt>, pp. 1–4.

Farinacci, D., et al., RFC 2784, "Generic Routing Encapsulation (GRE)", Mar. 2000, [online], Retrieved from the internet <URL: http://.src.doc.ic.ac.uk/computing/internet/rfc/rfc2784.txt>, pp. 1–8.

Huitema, Christian, "Routing in the Internet", Prentice–Hall, Inc., 1995, pp. 222–223.

IP Encapsulation Within IP, C. Perkins, Standards Track, Oct. 1996, 14 pages.

Generic Routing Encapsulation Over IPv4 Networks, S. Hanks, Oct. 1994.

Geoff Huston, "Interconnection, Peering and Settlements—Part I," pp. 1–16, Jul. 28, 2004 An article cited in the International Preliminary Examination Report for International Application No. PCT/US01/14366.

Geoff Huston, "Interconnection, Peering and Settlements—Part II," pp. 1–21, Jul. 28, 2004 An article cited in the International Preliminary Examination Report for International Application No. PCT/US01/14366.

* cited by examiner

Internet Peering Model

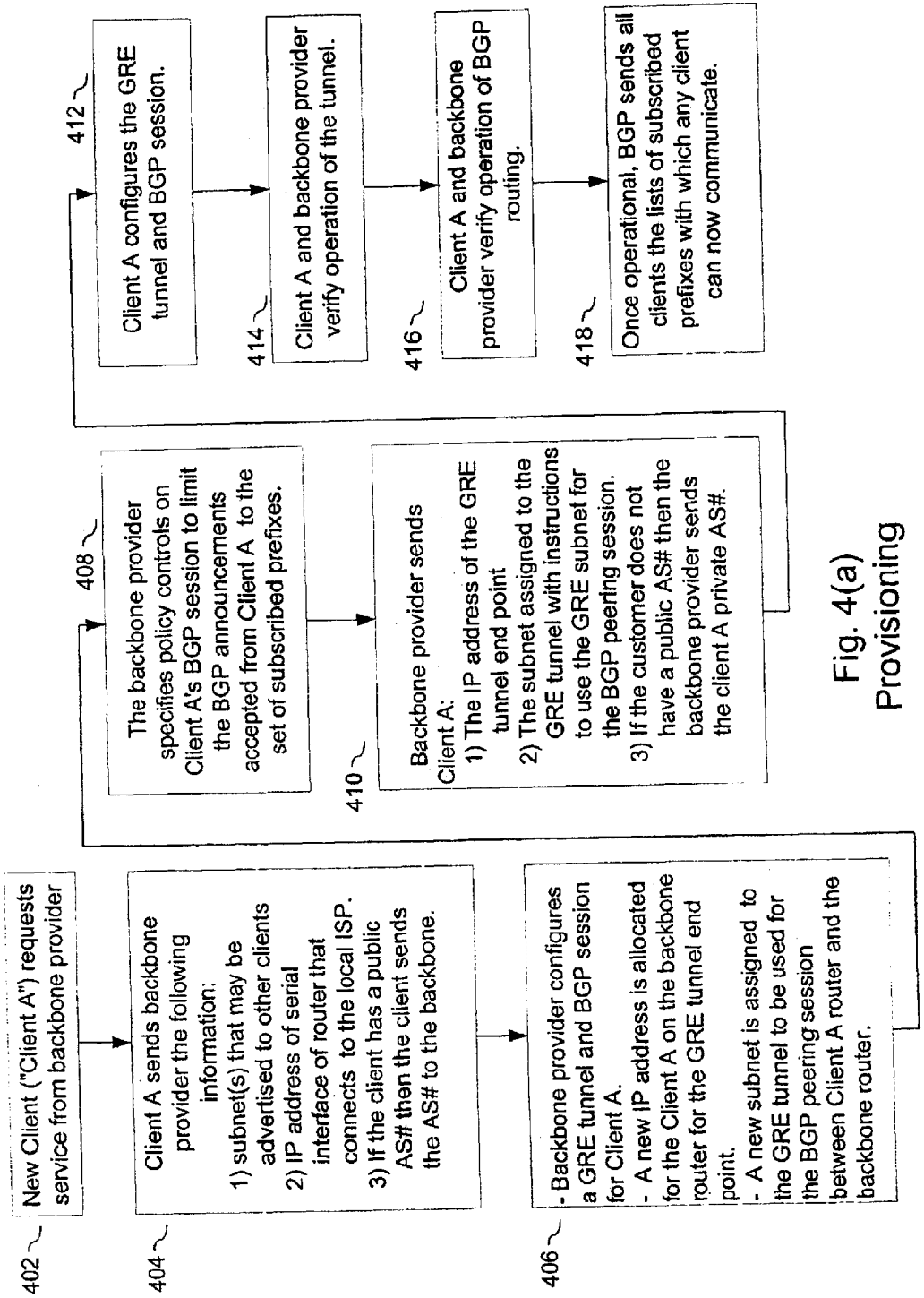
Fig. 4(a) Provisioning

Routing on First Client Router

Routing on first backbone edge router

Routing on Second Client Router

METHOD AND SYSTEM FOR SENDING INFORMATION ON AN EXTRANET

RELATED APPLICATIONS

This application claims priority from provisional application Ser. No. 60/202,456 of Gaddis, filed May 6, 2000, which is herein incorporated by reference in its entirety.

This application is a continuation in part of U.S. application Ser. No. 09/597,853 of Gaddis, filed Jun. 20, 2000 now abondoned, which is herein incorporated by reference in its entirety.

BACKGROUND

A. Technical Field

This application relates to a method and system providing a single, symmetric path for forward and return traffic between two points on a network.

B. Background of the Invention i. The Need for High Quality Internet Service

In certain situations, it is desirable to send data over a network with a high priority and with a guaranteed maximum transit time. For example, certain data may be needed in real time or may be of high importance. Currently, certain conventional network protocols (such as the Asynchronous Transfer Mode (ATM) protocol) contain provisions for indicating a "level of service" that particular transmitted data is to receive—a capability referred to as Quality of Service (QoS). Users pay premiums to obtain higher levels of service in an ATM network. It would be desirable to send data over the Internet with the same type of guarantees. Unfortunately, the design of the Internet does not provide for Internet Service Providers (ISPs) to cooperate in a way that would result in performance guarantees for the users of the Internet.

ii. Barriers to the Deployment of Hardware Solutions

One possible way to accomplish this goal of high quality service on the Internet would be to upgrade the routers used to route Internet traffic. Unfortunately, the deployment of Quality of Service (QoS) capable routers end-to-end in the Internet would require a massive investment. Making such a radical upgrade is not currently practical even if the carriers were motivated to do so. This creates a classic "chicken and egg" problem as to which will come first—the investment for the QoS network upgrades or the acceptance of a QoS service and the incremental revenue to pay for that investment.

The barriers to the deployment of QoS, therefore, are currently substantial. First, deployment of QoS requires a massive investment in network infrastructure. Second, there are currently no exchange services to facilitate the transfer between ISPs even if two ISPs made that investment. Third, the lack of current economic drivers (financial incentives to the ISPs) makes the necessary investment highly risky for ISPs or potential clients.

Many business customers have declined to migrate their strategic network systems from Frame Relay, ATM and private lines to the much more cost-effective public IP Internet because the internet cannot provide the performance and service guarantees they require. This lack of willingness to send data via the Internet has slowed the acceptance of Internet Virtual Private Networks (VPNs). If this lack of quality and confidence is left unchecked, it will slow Internet market segment growth into the B-2-B commerce market, which is estimated to exceed $7.3 trillion in B2B e-commerce transactions in the coming years.

iii. Asymmetric Routing

FIG. 1 is a block diagram showing a conventional Internet asymmetric network routing model. Peering is an example of a system that leads to asymmetric data transmission (i.e., point A to point B and point B to point A traffic does not use the same path). In this model, a client 110 connects to an originating ISP (such as a regional ISP 130) and a client 120 connects to another originating ISP (such as regional ISP 142). In this example, ISPs 130 and 142 act as both originating and terminating ISPs, because their customers both send and receive data, although this may not always be the case for all ISPs. The lack of economic incentives for carrying each other's traffic presents an obstacle to offering end-to-end performance guarantees, since each ISP generally tries to "get rid of" data to a peer as quickly as possible to minimize the costs of carrying the traffic. ISPs generally take a data packet to the closest "peering point," transfer it to the destination ISP's network, and that ISP carries it on to the destination end-user (i.e., their customer). This is referred to as "hot potato" routing, because it effectively gets traffic off of the originating ISPs network as quickly as possible. Once traffic is off-net of the originating ISP, the originating ISP cannot assure performance.

Because an ISP transfers packets off its network as quickly as possible, packets traveling between points A and B will not take the same path as packets traveling from B to A. In FIG. 1, when data is sent from user 110 to user 120, it is passed from originating ISP 130 to ISP 142, which acts as a "long-haul" ISP, transporting the data to client 120. This occurs because peering ISPs generally hand off data to a peer ISP as quickly as possible. Similarly, when data is sent from user 120 to user 110, it is passed from originating ISP 142 to ISP 130, which acts as a "long-haul" ISP, transporting the data to client 110. Again, ISP 142 generally uses hot potato routing.

As shown, most national ISPs currently exchange traffic using a "peering" connection, in which neither party pays the other party for the connection. Potential inequities exist in peering arrangements between national ISPs because push/pull traffic is usually not balanced. For example, users tend to download much more data than they upload. As a somewhat simplified example, if one ISP supports a web server and its peer ISP supports multiple users viewing the web, the data traffic will most likely be unequally distributed, with one ISP sending much more data than it is receiving.

FIG. 1 shows a packet having a source 110 and a destination 120 as it moves through the network. As the packet physically "hops" from one router to another, each router routes the packet in accordance with the address of destination 120. The same destination address is used to route the packet throughout the network in this example.

What is needed is a system and method that allows the QoS required to support B2B and other types of premium data delivery.

SUMMARY OF EMBODIMENTS OF THE INVENTION

The method and system of the invention provide a single, symmetric path for forward and return traffic between two points on the Internet. In this case "symmetric" means that a packet between point A and point B will take the same path on the Internet as a packet between point B and point A. Moreover, as much of this path as possible is transmitted over a high speed backbone (also called an extranet). The described embodiments of the present invention aid in providing guaranteed Quality of Service (QoS) to clients, whether those clients are individual users, other carriers, or companies because the packets will take fewer hops and will be transmitted over a high quality backbone for a significant part of its journey.

The described embodiments of the present invention create a tunnel, such as a GRE tunnel, between a client's router and an edge router on the backbone. This process creates a logical interface on the client's router that is used to send traffic destined for other endpoints on the network. A destination router will have a similar tunnel established and will receive the packet through that tunnel. A dynamic routing protocol with policy control capability (for example, BGP-4) is created inside the tunnel in order to announce routes that are available on the network service. Use of such a routing protocol creates a routing situation that allows standard best-effort traffic to flow over the customer's ISP and out to destinations on the Internet, but causes business critical traffic to flow over the backbone network to ensure delivery quality.

Because a limited set of routes is advertised to network clients, the service cannot be used as a general Internet transit service. Only client destinations can be reached via the tunnels. Additionally, because a dynamic routing protocol is used for routing, if the service becomes unavailable, the destination is still reachable via the standard Internet path. This ensures that a failure in the service does not impair critical data flow.

Advantages of the invention will be set forth in part in the description which follows and in part will be apparent from the description or may be learned by practice of the invention. The objects and advantages of the invention will be realized and attained by means of the elements and combinations particularly pointed out in the appended claims and equivalents.

BRIEF DESCRIPTION OF THE DRAWINGS

FIG. 4(a)–4(d) are flow charts showing details of the routing method of FIG. 3.

DETAILED DESCRIPTION OF EMBODIMENTS

Reference will now be made in detail to several embodiments of the present invention, examples of which are illustrated in the accompanying drawings. Wherever practicable, the same reference numbers will be used throughout the drawings to refer to the same or like parts.

It will be understood that certain diagrams herein are somewhat simplified for clarity for explanation. For example, many systems in accordance with the invention include multiple exchanges, multiple customers per exchanges, and multiple clients per customer.

Figure 1:
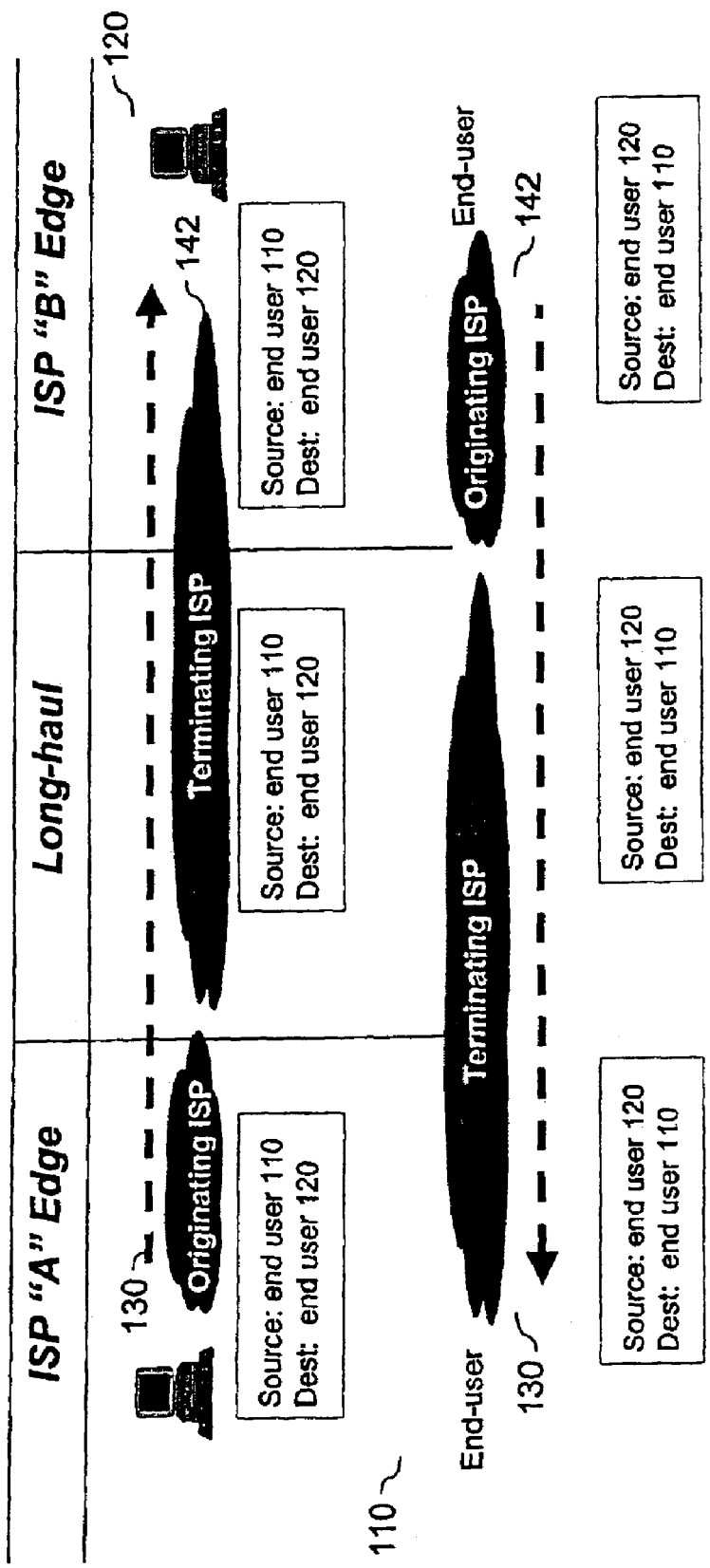
FIG. 1 is a block diagram showing a conventional Internet asymmetric network routing model.
Figure 2:
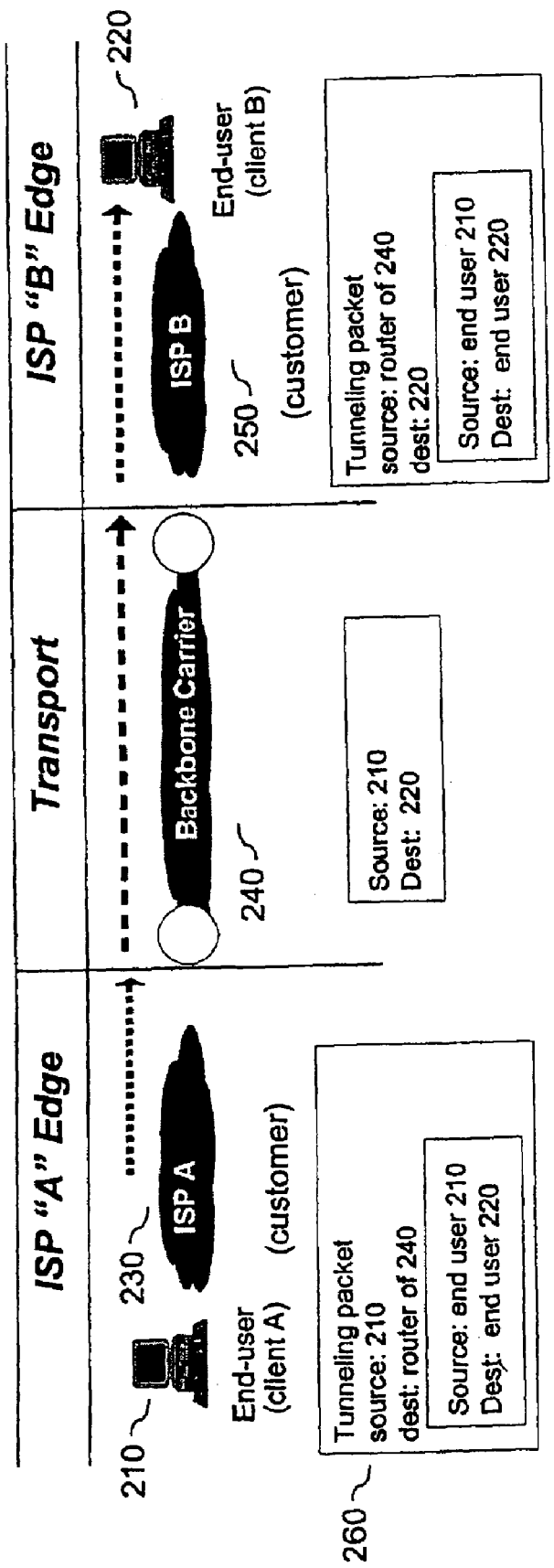
FIG. 2 is a block diagram showing a networking model in accordance with a preferred embodiment of the present invention.

FIG. 2 is a block diagram showing a networking model in accordance with an embodiment of the present invention. It should be noted that the network of FIG. 2 uses symmetric routing since packets sent from point A to point B take the same path through the tunnels as packets sent from point B to point A. In this model, end users A and B 210, 220 (herein called "clients") still contract with their local ISPs for service as described above. ISP 230 and ISP 250 are called "customers" of the backbone carrier 240. In certain embodiments in accordance with the system of FIG. 2, backbone 240 agrees to a Service Level Agreement (SLA) with each customer or with each client to meet certain quality requirements for delivery of this data.

FIG. 2 shows a simplified example of a TCP packet 260 sent between client 210 and client 220. The initial packet has a source field identifying client 210 and a destination field identifying client 220. At the client's router, as described below in detail, a tunneling packet header is added to the original packet. The tunneling packet header identifies the source as client 210 and the destination as an edge router of backbone 240. The packet is then routed through the tunnel between the client's 210 router and the first edge router in accordance with its new header.

Once the packet reaches the destination edge router of backbone 240, it is recognized as a packet received through a tunnel and the tunneling packet header is stripped off, leaving the original packet header with the original packet destination (i.e., client 220). The packet is then routed according to its original header to a second edge router on backbone 240.

The second edge router of backbone 240 recognizes that the packet is destined for a client having a tunnel. It adds a second tunneling packet header to the original packet. The second tunneling packet header identifies the source as the edge router of backbone 240 and the destination as client 220. The packet is then routed through the second tunnel between the edge router and the client's router. This process is described in more detail in connection with FIGS. 3(a)–3(c) and 4(a)–4(d).

Figure 3A:
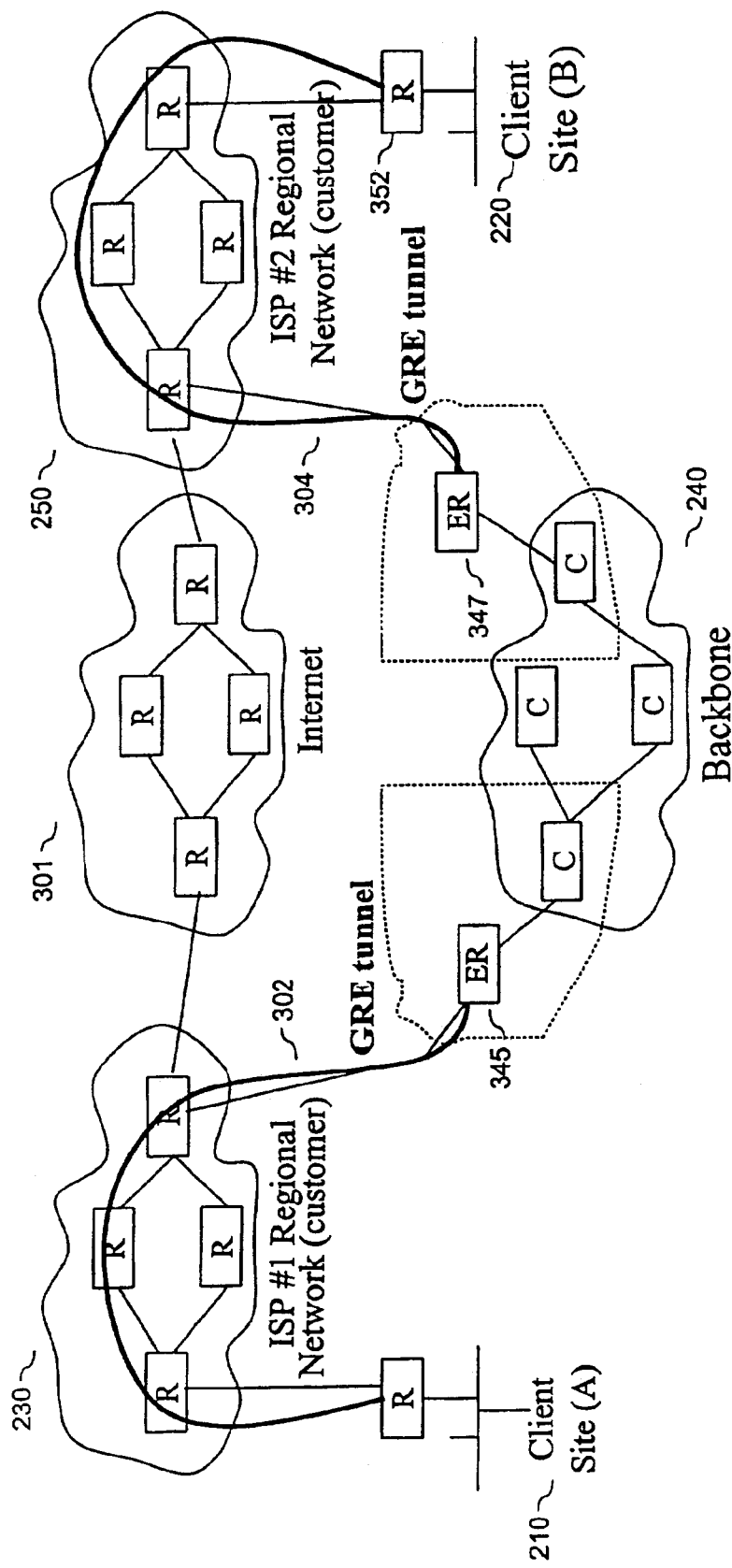
FIGS. 3(a) and 3(b) are block diagrams showing a network in accordance with a preferred embodiment of the present invention.

In FIG. 3(a), backbone 240 has at least two edge routers 345, 347. Customers, such as regional ISPs 230, 250, connect to backbone structure 240 via these edge routers. In the example, clients A and B connect to exchange sites of backbone 240 via regional networks 230 and 250 (customers) by establishing respective tunnels 302 and 304 on regional networks 230 and 250. In this embodiment, the tunnel is preferably implemented using the GRE tunneling protocol as defined in at least RFC 1701, RFC 1702, and RFC 2784 (GRE over IP), which are herein incorporated by reference. "RFCs" ("Request for Comments") are documents available from the Internet Engineering Taskforce (IETF) defining various aspects of Internet design and operation. Any appropriate protocol may be used to implement tunneling, including but not limited to Microsoft's PPTP protocol or Cisco System's Layer 2 Forwarding protocol. Use of a tunnel between a client and an edge router helps ensure that the customer's data is delivered to the backbone carrier. FIG. 3(a) also includes various routers (R) within the Internet transit system 301, various routers (R) within ISPs 230, 250, and various routers (C) within backbone 240.

Figure 3B:
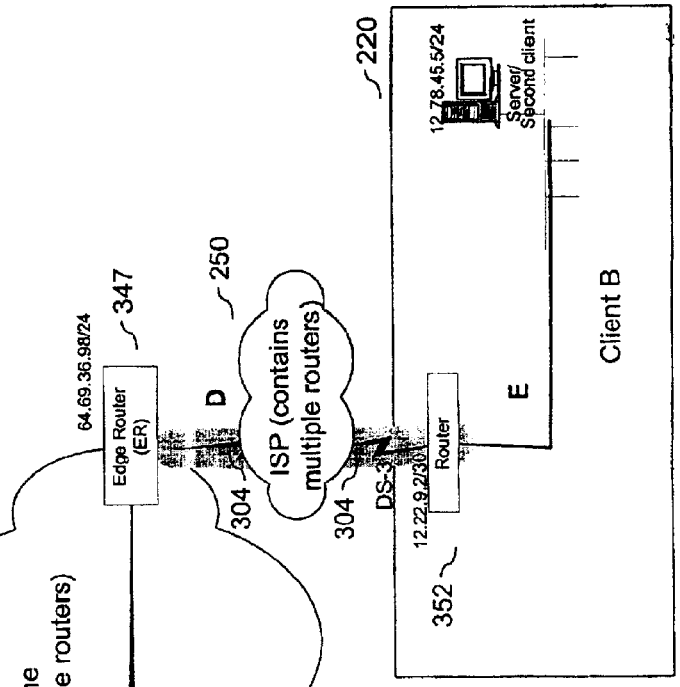
Figure 3C:
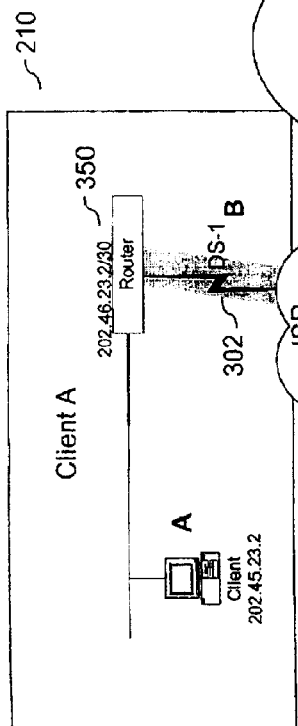
FIG. 3(c) is a table showing source and destination addresses of a packet as it travels through the network of FIG. 3(b).

FIG. 3(b) is a block diagram showing a network having multiple customers in accordance with a preferred embodiment of the present invention. FIG. 3(c) is a table showing destination and source addresses of a packet as it travels through the network of FIG. 3(b). FIG. 3(c) shows a packet at points A, B, C, D, and E as it travels from its original source client A (also called a "first client") to its original client B(also called a "second client").

In this example, client A having IP address 202.45.23.2 sends a packet to client B (such as a web server) having IP address 12.78.45.5. At point A in FIG. 3(b), the source of the packet is the original source, client A (IP address 202.45.23.2) and the destination is the original client B (IP address 12.78.45.5).

In client A's router 350, the packet from point A receives a new tunneling-packet header specifying that the source of the packet is the client router (IP address 202.46.23.2) and the destination is an edge router 345 in the backbone (IP address 64.69.35.98). In the example, the routing table on the client router 350 was previously filled with routing information from its hosting edge router 345 to effect this routing in accordance with a centralized BGP-4 routing policy. Thus, packets to and from client A to client B will always travel to the backbone through the tunnel between the backbone 240 and client A's router 350. It should be noted that the packet may travel through one or more other networks on its way to the backbone (or it may be connected directly to the backbone).

When the packet is received at the first edge router 345 of the backbone 240, it is stripped of its packet-tunneling header, and the destination again becomes that of the original client B (IP address 12.78.45.5). Thus, within the backbone, at point C, the packet reverts to its destination of IP address 12.78.45.5 and a source of the original client (IP address 202.45.23.2). The packet is routed through the backbone 240 using normal routing methods. The routing tables of the backbone have been set to direct a packet to client B to a second edge router 347 on the backbone.

Once the packet reaches the second edge router 347 of the backbone, the second edge router 347 recognizes it as a packet destined for a client who has a tunnel established. At point D, the second edge router gives the packet a new tunneling-packet header specifying that the source of the packet is itself (IP address 64.69.36.98) and the destination is the router of the client B (IP address 12.22.9.2). Thus, packets to and from the original source, client A, to the original destination, client B, will always travel to the backbone 240 through the tunnel 304 between the second edge router of the backbone and client B's router. Once the packet reaches client B's router 352, the tunneling header is stripped off by the router, and the packet is delivered to its destination.

Use of a tunnel between a client and an exchange site helps ensure that the customer's data is delivered to the backbone carrier. In the example, the clients connect to exchange sites of the backbone 240 by establishing respective tunnels 302 and 304.

FIGS. 4(a)–4(d) are flow charts showing details of the routing method of FIG. 3.

FIG. 4(a) shows an example of a provisioning method used to establish the tunnel between a new client and the backbone provider. Initially, a new client requests 402 service from the backbone provider. Client A is used as a new client by way of example. This request may be done by way of a telephone call or web form from a human being, or by any other appropriate method. In conjunction with the request, the new client sends 404 the following information:

subnet(s) for client A that may be advertised to other clients

IP address of serial interface of client A's router that connects to the local ISP.

If client A has a public AS# (Autonomous System number) then the client sends the AS# to the backbone provider.

Once this information is received, the backbone provider configures 406 a GRE tunnel and BGP session for client A. This is done once per tunnel, since the tunnel will persist once established. A particular edge router will host the client's session. At this time, a new IP address is allocated for client A on the backbone router for the GRE tunnel end point and a new subnet is assigned to the GRE tunnel. This subnet is used for the BGP peering session between client A and the backbone router.

Next, the backbone provider specifies 408 policy controls on client A's BGP session to limit the BGP announcements to the set of subscribed prefixes. The backbone provider also sends 410 to client A the following:

The IP address of the GRE tunnel end point

The subnet assigned to the GRE tunnel with instructions to use the GRE subnet for the BGP peering session.

If the client does not have a public AS# then the backbone provider sends client A a private AS#.

Client A configures 412 the GRE tunnel and BGP session and the client and backbone provider verify 414 operation of the tunnel. Client A and the backbone provider also verify 416 operation of BGP routing at this time.

Once operational, BGP sends 418 all clients the lists of subscribed prefixes. A client, by definition, has an established tunnel to the backbone and all clients can communicate using the tunnel and backbone. (Unless, of course the backbone is unavailable, at which time the clients communicate over the regular Internet, as shown in FIG. 3(a)).

A preferred embodiment of the present invention uses a centralized routing policy in which transmission and reception of routes to individual clients is controlled by each edge router in the backbone. Thus, the described embodiment uses a client-specific centralized routing policy. Each edge router controls what routes are accepted from each client and which routes are transmitted to each client, using the routing policy installed on the edge router at the time of provisioning. Each edge router inspects and then rejects or approves the subnets received from a new client. If the subnets from that client are approved, then they are forwarded to every other edge router in the backbone. Each client tunnel session is hosted by a specific edge router. Once the routes are received from the other edge routers, each edge router will apply the routing policies for its hosted clients to determine whether to forward the received routes to those clients.

Figure 4B:
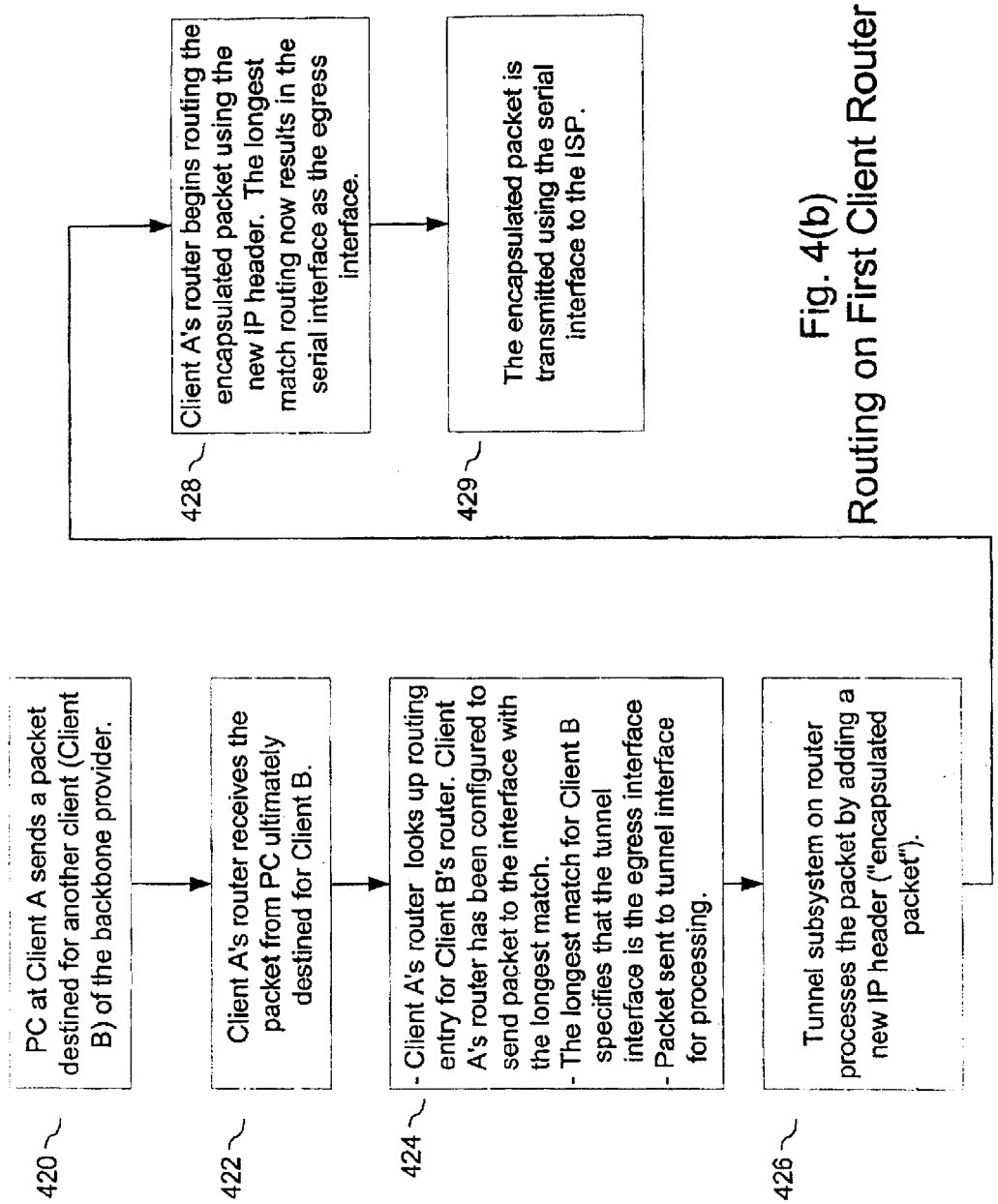

FIG. 4(b) shows how a PC on client A sends a packet destined for another client (client B) of the backbone provider. Although the term "PC" is used herein, it is understood that the PC could be any appropriate type of computer or computing device.

First, the client A's router receives 422 the packet ultimately destined for client B. The router at client A looks up 424 the routing entry for client B's router in the routing tables of the router for client A. Client A's router has been configured to send the packet to the interface with the longest match. The longest match for client B specifies that the tunnel interface is the egress interface of client A's router. The packet is sent to the tunnel interface for processing.

The tunnel subsystem on client A's router processes 426 the packet by adding a new IP header to the packet, using the rules in RFCs 1702 and 2784. This is called "encapsulating the packet." Client A's router begins routing 428 the encapsulated packet using the new IP header. The longest match routing now results in the serial interface as the egress interface of the router. The encapsulated packet is transmitted 429 using the serial interface of the router to the ISP.

Figure 4C:
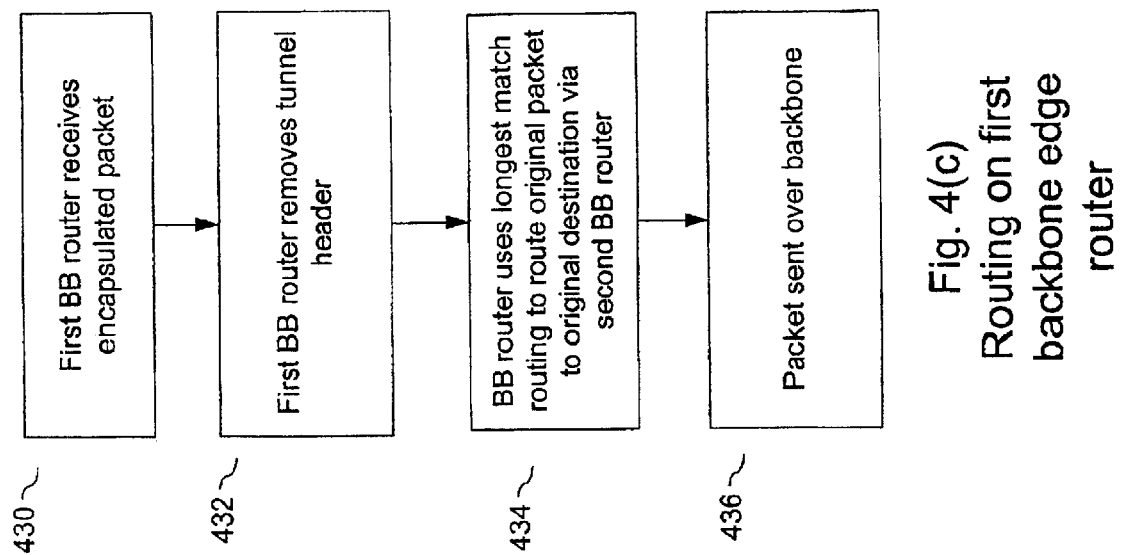

FIG. 4(c) is a flowchart showing how a first backbone edge router, receiving 430 a packet through a tunnel from client A, routes the packet onward. As shown in FIG. 3, the edge router removes 432 the packet header added by client A's router. The edge router then uses the longest match routing algorithm on the destination of the original packet to route and send 434, 436 the packet onward through the backbone. The routing tables of the backbone are set to route the packets to the destination through the backbone to the second edge router.

Figure 4D:
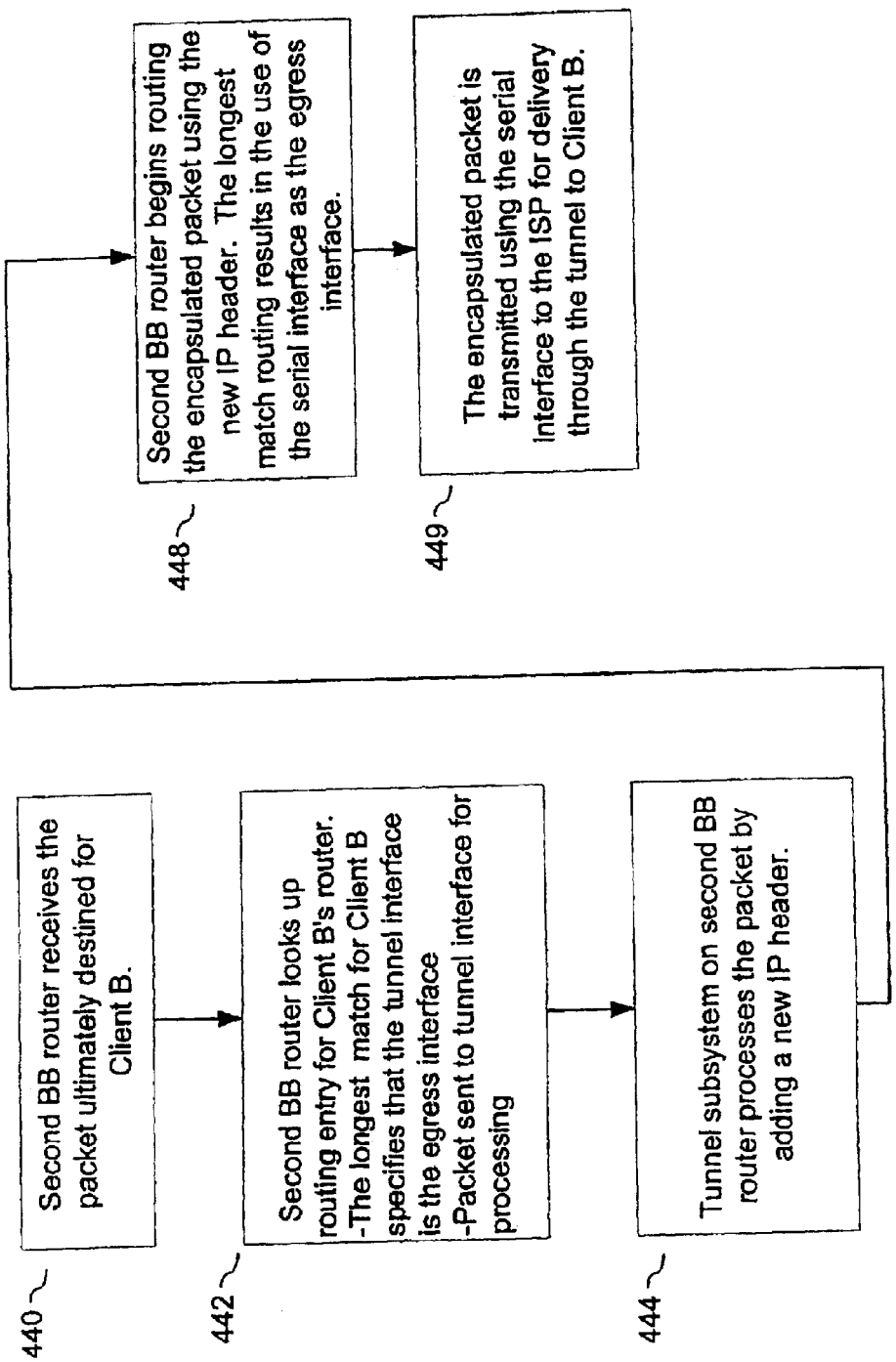

FIG. 4(d) shows how the second edge router of the backbone routes the packet so that it is sent through the second tunnel to a router of client B. First, the second edge router receives 440 the packet destined for client B. The second edge router looks up 442 the routing entry for client B in the routing tables of the edge router. The longest match for the second client specifies that the tunnel interface is the egress interface of the edge router. The packet is sent to the tunnel interface for processing.

The tunnel subsystem on the edge router processes 444 the packet. This processing adds a new IP header to the packet, using the rules in RFCs 1702 and 2784. The second edge router of the backbone begins routing the encapsulated packet using the new IP header. The longest match routing results 448 in the serial interface as the egress interface of the second edge router. The encapsulated packet is transmitted 448 using the serial interface to the router of client B. Client B's router strips away the encapsulation and delivers the packet to client B's computer or computing device.

A similar method is used to transmit packets from client B to client A.

In summary, the routing method and system of the present invention creates an optimally routed network between arbitrary locations on the Internet. The routing to and from any two given clients is symmetric because all packets between the two clients pass through a tunnel between the sending router and the backbone, and back out a tunnel between the backbone and the destination router. This method, therefore, provides an overlay network on the Internet for the transport of premium class traffic. The method also provides auto learning of new subscribers by existing subscribers because the described embodiment uses the BGP routing protocol, which updates the routing tables of clients when a new client is added.

Centralized routing policy administration allows the backbone provider to control client access. This control facilitates stability and eliminates backbone failures due to client errors.

Accordingly, the present invention is intended to embrace all such alternatives, modifications and variations as fall within the spirit and scope of the appended claims and equivalents.

What is claimed is:

1. A method of sending a message sent over a network by way of a backbone carrier, comprising:
    establishing a first tunnel between a first client and to but not through a backbone;
    establishing a second tunnel between a second client and to but not through the backbone;
    receiving, by the backbone, a packet through the first tunnel, from the first client,
    routing the packet through the backbone; and
    sending, by the backbone, the packet through the first tunnel, to the second client,
    wherein packets transferred between said first and second clients utilize a common path defined by the first tunnel, the backbone, and the second tunnel.

2. The method of claim 1, wherein the first tunnel is an IP in IP tunnel.

3. The method of claim 1, wherein the first tunnel is a GRE tunnel.

4. The method of claim 1, wherein establishing a first tunnel includes establishing a first tunnel between a router of a backbone and a router of the first client.

5. The method of claim 1, wherein establishing a second tunnel includes establishing a second tunnel between a router of a backbone and a router of the second client.

6. The method of claim 1, further including informing all clients when a new tunnel is created.

7. The method of claim 1, further comprising sending a packet via a best-effort transport mechanism when a tunnel or the backbone is not available.

8. The method of claim 1, further comprising sending updates to the routing table of the first client's router causing packets to be sent to clients to be sent through the tunnel.

9. The method of claim 1, further comprising adding, by the first client's router, a new header to packets to be sent to clients, indicating that the packet's destination is a router in the backbone.

10. The method of claim 1, wherein routing the packet through the backbone includes:
    determining that the packet was received via a tunnel;
    stripping a tunnel-packet header from the packet; and
    routing the packet according to the destination address in the original packet after the tunnel-packet header is removed.

11. The method of claim 1, wherein routing the packet through the backbone includes:
    determining the original destination address of the packet; and
    routing the packet in accordance with its original destination address.

12. The method of claim 1, wherein sending the packet to the second client through the second tunnel includes:
    adding a new header to the packet that indicates that the packet is to be sent via the second tunnel; and
    sending the packet to the second client through the second tunnel.

13. The method of claim 1, wherein each edge router operates in accordance with a centralized routing policy for its hosted client sessions.

14. A method of establishing Internet routing tables, comprising:
    establishing a first tunnel between a first client and to but not through a backbone; and
    establishing a second tunnel between a second client and to but not through the backbone, wherein the first and second tunnels and the backbone form a symmetric path for forward and return traffic between the first and second client on the Internet.

15. A system that sends a message over a network by way of a backbone carrier, comprising:
    means for establishing a first tunnel between a first client and to but not through a backbone;
    means for establishing a second tunnel between a second client, and to but not through the backbone;
    means for receiving, by the backbone, the packet through the first tunnel, from the first client;
    means for routing the packet through the backbone;
    means for sending, by the backbone, the packet through the first tunnel, to the second client; and
    means for transferring packets between said first and second clients utilizing a common path defined by the first tunnel, the the backbone, and the second tunnel.

16. A system that sends a message over a network by way of a backbone carrier, comprising:
> a portion configured to establish a first tunnel between a first client and to but not through a backbone;
> a portion configured to establish a second tunnel between a second client and to but not through the backbone;
> a portion configured to receive, by the backbone, a packet through the first tunnel, from the first client;
> a portion configured to route the packet through the backbone; and
> a portion configured to send, by the backbone, the packet through the first tunnel, to the second client, wherein packets transferred between said first and second clients utilize a common path defined by the first tunnel, the the backbone, and the second tunnel.

17. The system of claim 16, wherein the first tunnel is an IP in IP tunnel.

18. The system of claim 16, wherein the first tunnel is a GRE tunnel.

19. The system of claim 16, wherein the portion configured to establish a first tunnel includes a portion configured to establish a first tunnel between a router of a backbone and router of the first client.

20. The system of claim 16, wherein the portion configured to establish a second tunnel includes a portion configured to establish a second tunnel between a router of a backbone and a router of the second client.

21. The system of claim 16, further including a portion configured to inform all clients when a new tunnel is created.

22. The system of claim 16, further comprising a portion configured to send a packet via a best-effort transport mechanism when a tunnel or the backbone is not available.

23. The system of claim 16, further comprising sending updates to the routing table of the first client's router causing packets to be sent to clients to be sent through the tunnel.

24. The system of claim 16, further comprising a portion configured to add, by the first client's router, a new header to packets to be sent to clients, indicating that the packet's destination is a router in the backbone.

25. The system of claim 16, wherein routing the packet through the backbone includes:
> a portion configured to determine that the packet was received via a tunnel;
> a portion configured to strip a tunnel-packet header from the packet; and
> a portion configured to route the packet according to the destination address in the original packet after the tunnel-packet header is removed.

26. The system of claim 16, wherein the portion configured to route the packet through the backbone includes:
> a portion configured to determine the original destination address of the packet; and
> a portion configured to route the packet in accordance with its original destination address.

27. The system of claim 16, wherein the portion configured to send the packet to the second client through the second tunnel includes:
> a portion configured to add a new header to the packet that indicates that the packet is to be sent via the second tunnel; and
> a portion configured to send the packet to the second client through the second tunnel.

28. The system of claim 16, wherein each edge router operates in accordance with a centralized routing policy for its hosted client sessions.

29. A system of establishing Internet routing tables, comprising:
> means for establishing a first tunnel between a first client and to but not through a backbone; and
> means for establishing a second tunnel between a second client and to but not through the backbone, wherein the first and second tunnels and the backbone form a symmetric path for forward and return traffic between the first and second client on the Internet.

30. A system of establishing Internet routing tables, comprising:
> a portion configured to establish a first tunnel between a first client and to but not through a backbone; and
> a portion configured to establish a second tunnel between a second client and to but not through the backbone, wherein the first and second tunnels and the backbone form a symmetric path for forward and return traffic between the first and second client on the Internet.

31. A computer program product, including program instructions on a computer-readable medium, the instructions comprising instructions allowing a computer to perform:
> establishing a first tunnel between a first client and to but not through a backbone;
> establishing a second tunnel between a second client and to but not through the backbone; and
> transferring packets between said first and second clients utilizing a common path defined by the first tunnel, the the backbone, and the second tunnel.

32. A computer program product, including program instructions on a computer-readable medium, the instructions comprising instructions allowing a computer to perform:
> establishing a first tunnel between a first client and to but not through a backbone; and
> establishing a second tunnel between a second client and to but not through the backbone, wherein the first and second tunnels and the backbone form a symmetric path for forward and return traffic between the first and second client on the Internet.

* * * * *

UNITED STATES PATENT AND TRADEMARK OFFICE
CERTIFICATE OF CORRECTION

PATENT NO. : 6,965,937 B2 Page 1 of 1
APPLICATION NO. : 09/849176
DATED : November 15, 2005
INVENTOR(S) : Michael E. Gaddis et al.

It is certified that error appears in the above-identified patent and that said Letters Patent is hereby corrected as shown below:

Column 7, line 63:
Replace with --sending, by the backbone, the packet through the second tunnel, to the second client,--

Column 8, line 67:
Replace with: --first tunnel, the backbone, and the second tunnel.--

Column 9, line 16:
Replace with: --the backbone, and the second tunnel.--

Column 10, line 42:
Replace with: --utilizing a common path defined by the first tunnel,--

Signed and Sealed this

Twenty-ninth Day of May, 2007

JON W. DUDAS
*Director of the United States Patent and Trademark Office*